(12) United States Patent
Kim et al.

(10) Patent No.: US 7,362,513 B2
(45) Date of Patent: Apr. 22, 2008

(54) SERRATION APPARATUS FOR PORTABLE TERMINAL

(75) Inventors: Jae-Shik Kim, Seongnam-si (KR); Hong-Bae Kim, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 199 days.

(21) Appl. No.: 11/268,097

(22) Filed: Nov. 7, 2005

(65) Prior Publication Data
US 2006/0200941 A1 Sep. 14, 2006

(30) Foreign Application Priority Data
Mar. 9, 2005 (KR) .................. 10-2005-0019789

(51) Int. Cl.
*G02B 15/14* (2006.01)
*H04N 5/225* (2006.01)

(52) U.S. Cl. ..................... 359/704; 348/360
(58) Field of Classification Search .......... 359/809, 359/811, 817, 819, 822–827, 829–830, 694, 359/699–706; 348/207.99–376; 250/208.1, 250/216, 239; 455/575.1, 90.3; 379/433.01, 379/433.05, 433.13
See application file for complete search history.

(56) References Cited

U.S. PATENT DOCUMENTS

| 2003/0038567 A1 | 2/2003 | Doan |
| 2004/0216273 A1* | 11/2004 | Kang et al. .................. 16/264 |
| 2005/0094025 A1* | 5/2005 | Yoon .......................... 348/360 |

FOREIGN PATENT DOCUMENTS
KR   10-2004-0102755   12/2004

* cited by examiner

*Primary Examiner*—Scott J. Sugarman
*Assistant Examiner*—DaWayne A Pinkney
(74) *Attorney, Agent, or Firm*—The Farrell Law Firm, PC

(57) ABSTRACT

Disclosed is a serration apparatus for a portable terminal mounted in a camera lens module of the portable terminal having a serration module. The serration apparatus includes a first serration gearing; a second serration gearing mounted on the camera lens module and receiving and compressively meshing with the first serration gearing within its inner side, wherein when the camera lens module is rotated, the second serration gearing is rotated with the camera lens module and produces frictional force against the first serration gearing, thereby creating a clicking feeling; and an elastic member for providing compressing force to cause the first and second gearings to be meshed with each other.

21 Claims, 13 Drawing Sheets

SERRATION APPARATUS FOR PORTABLE TERMINAL

PRIORITY

This application claims priority to an application entitled "Serration Apparatus for Portable Terminal" filed with the Korean Industrial Property Office on Mar. 9, 2005 and assigned Serial No. 2005-19789, the contents of which are incorporated herein by reference.

BACKGROUND OF THE INVENTION

1. Field of the Invention

The present invention relates to a serration apparatus for a portable terminal, and in particular to a serration apparatus for a portable terminal provided with a serration module which is mounted and assembled to a camera lens module of the mobile phone.

2. Description of the Related Art

Typically, a "portable communication apparatus" refers to an apparatus which allows a user to perform wireless communication with another person while carrying the apparatus. A portable communication apparatus can include Hand Held Phones (HHP's), CT-2 cellular phones, digital phones, Personal Digital Assistants (PDA's), etc. and can be classified into various types on the basis of the appearance thereof. For example, the portable communication apparatus can be classified into bar type, flip type or folder type portable terminal according to its appearance. Bar type mobile terminals have a single bar-shaped housing, flip type mobile terminals have a flip or cover rotatably connected to a bar-shaped housing via a hinge device, and folder type mobile terminals have a folder rotatably connected to a single bar-shaped housing via a hinge device.

To facilitate image communication, a conventional portable communication apparatus is provided with a camera lens module (well known in the art) to allow photographing of an object. Such a lens module comprises a camera lens, a Change Coupled Device (CCD) device and circuitry for transmitting a signal from the CCD device.

A camera lens module mounted in an above-mentioned folder type terminal is described below by way of an example.

A conventional folder type terminal comprises a body housing 1 with a plurality of keys 1a and a microphone 1c, a folder 2 with an Liquid Crystal Display (LCD) module 2a and a speaker (not shown), and a hinge device 3 for rotatably interconnecting the body housing 1 and the folder 2 (as shown in FIG. 17). The hinge device 3 consists of a hinge housing 3a, a hinge cam 3b, a hinge shaft 3c and a hinge spring 3d, as shown in FIG. 3. A camera lens module 4 is rotatably mounted in one of the body housing 1, the folder 2 and the hinge device 3. A serration apparatus 5 is provided at one side of the camera lens module 4, so that the vibration of the lens module 4 produced as the lens module 4 is rotated can be transferred by tactile sense to a user.

As shown in FIG. 1, the serration apparatus 5 of the camera lens module 4 comprises a first serration dummy 5a, a second serration dummy 5b having a pogo spring 6 engaged with one side of the first serration dummy 5a so as to create clicking feeling when the first serration dummy 5a is rotated, and an interconnection device 7 for interconnecting the first and second dummies 5a and 5b.

When assembling such a conventional serration apparatus for a conventional portable terminal, it is necessary to separately assemble the first and second serration dummies and interconnection device, to fit the assembly onto a hinge arm provided in the terminal, to mount the camera lens module from this state, and then to connect hinge modules in sequence. As the number of assembled parts increases, it is difficult to assemble the camera lens module and the serration apparatus.

In addition, the conventional serration apparatus for a portable terminal has a disadvantage in that because the first and second serration dummies are both formed from a metallic material, material costs and costs for post-processing, such as plating, are increased and manufacturing costs are high as compared with a product formed from a plastic material.

Moreover, there is also a problem in that it is difficult to manufacture the parts such as the first and second serration dummies because it is necessary to form a hole for passing a flexible circuit provided for the camera lens module through each of the first and second serration dummies.

SUMMARY OF THE INVENTION

Accordingly, the present invention has been made to solve the above-mentioned problems occurring in conventional systems, and an object of the present invention is to provide a serration apparatus for a portable terminal having a camera lens module, in which a serration module is configured to be mounted in and assembled to the camera lens module of the portable terminal, so that the clicking feeling and assembling process of the camera lens can be improved.

Another object of the present invention is to provide a serration apparatus for a portable terminal having a camera lens module, in which plural serration gearings adapted to mesh with each other are provided in the portable terminal, so that the rotation clicking feeling of the camera lens module can be improved.

Another object of the present invention is to provide a serration apparatus for a portable terminal, in which the serration apparatus is provided with a stopper function, so that the stopper function of the camera lens can be improved.

Still another object of the present invention is to provide a serration apparatus for a portable terminal having a camera lens module, in which the serration apparatus is formed from a synthetic resin material, so that the material costs can be reduced and the manufacturing costs can be saved by avoiding and reducing post-processing requirements.

In order to achieve the above-mentioned objects, according to a first embodiment of the present invention, there is provided a serration apparatus for a portable terminal having a camera lens module including a first serration gearing; a second serration gearing mounted on the camera lens module, wherein the second serration gearing receives the first serration gearing within its interior and is compressed against the first serration gearing to mesh with the first serration gearing, and when the camera lens module is rotated, the second serration gearing is rotated with the camera lens module and produces frictional force against the first serration gearing, thereby creating a clicking feeling; and elastic means for providing compressing force to cause the first and second gearing to be meshed with each other.

According to a second embodiment of the present invention, there is provided a serration apparatus for a portable terminal having a camera lens module including a pogo spring mounted on the camera lens module; and a serration module connected to the camera lens module to correspond to the pogo spring, thereby producing frictional force and thus creating a clicking feeling as the camera lens module is rotated in a forward or reverse direction.

In addition, according to a third embodiment of the present invention, there is provided a serration apparatus for a portable terminal having a camera lens module including a serration housing restrained in the camera lens module; and a serration module provided in the serration housing and having a pogo spring around its circumferential periphery to correspondingly contact with an inner surface of the serration housing, thereby producing frictional force and thus creating a clicking feeling when the camera lens module is rotated in a forward or reverse direction.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
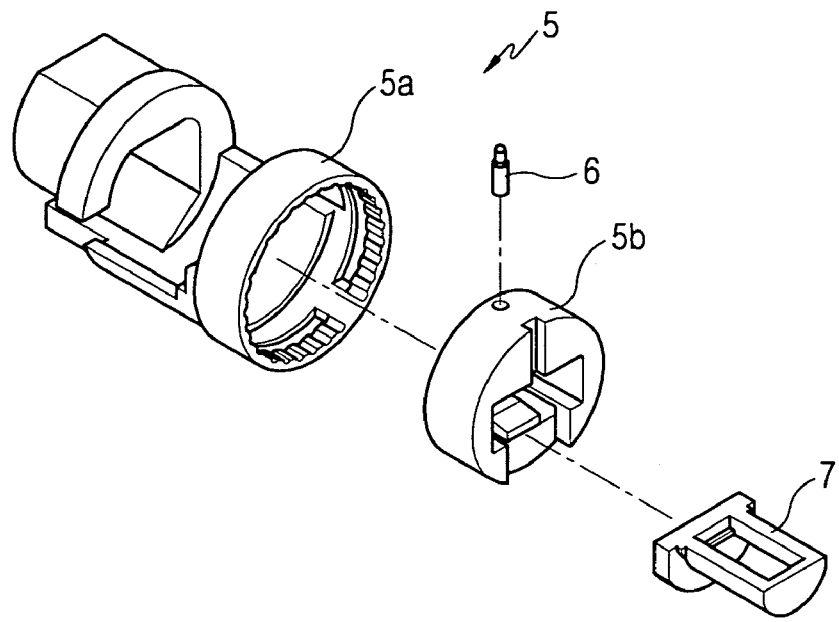
FIG. 1 is an exploded perspective view showing a conventional serration apparatus for a portable terminal.
Figure 2:
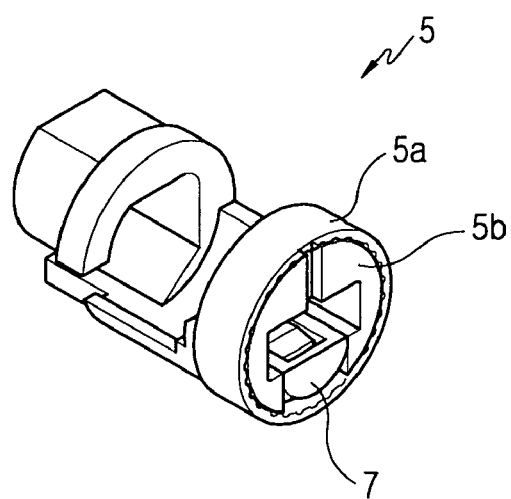
FIG. 2 is a perspective view showing the serration apparatus of FIG. 1 in the assembled state.
Figure 3:
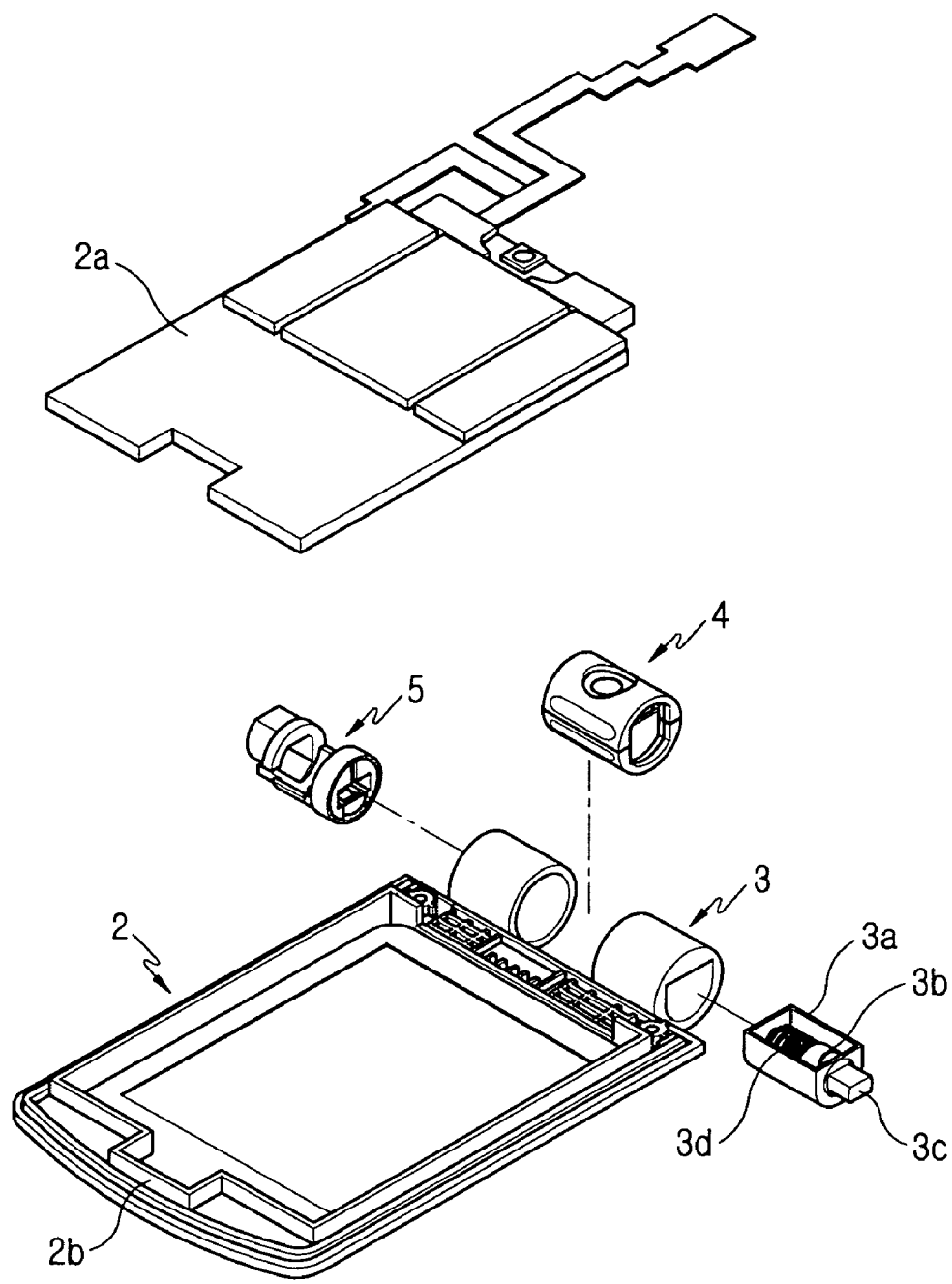
FIG. 3 is an exploded perspective view showing the sequence of assembling the serration apparatus to a folder type portable terminal having a conventional camera lens module.

Hereinafter, preferred embodiments of the present invention will be described with reference to the accompanying drawing. In the following description, a detailed description of known functions and configurations incorporated herein will be omitted to avoid making the subject matter of the present invention unclear.

As shown in FIGS. 4-8, a serration apparatus 10 for a portable terminal comprises first and second serration gearings 20, 30 and elastic means 40, wherein the first serration gearing 20 is fitted and secured to one end of a hinge device 3, so that the first serration gearing 20 correspondingly meshes with the second serration gearing 30. The first and second serration gearings 20, 30 are fitted in one side of the camera lens module 4 in such a manner that the first serration gearing 20 is received within the interior of the second serration gearing 30 and compressed against the second serration gearing 30, so that the first and second serration gears 20, 30 mesh with each other and the second serration gearing 30 is rotated with the camera lens module 4 as the camera lens module 4 is rotated. During rotation, a frictional force is produced between the first and second gearings 20, 30, to create a clicking feeling, and the elastic means 40 is interposed between one side of the second serration gearing 30 and the one side of the camera lens module 4 to provide a compressing force for causing the first and second serration gearings 20, 30 to mesh with each other.

Figure 4:
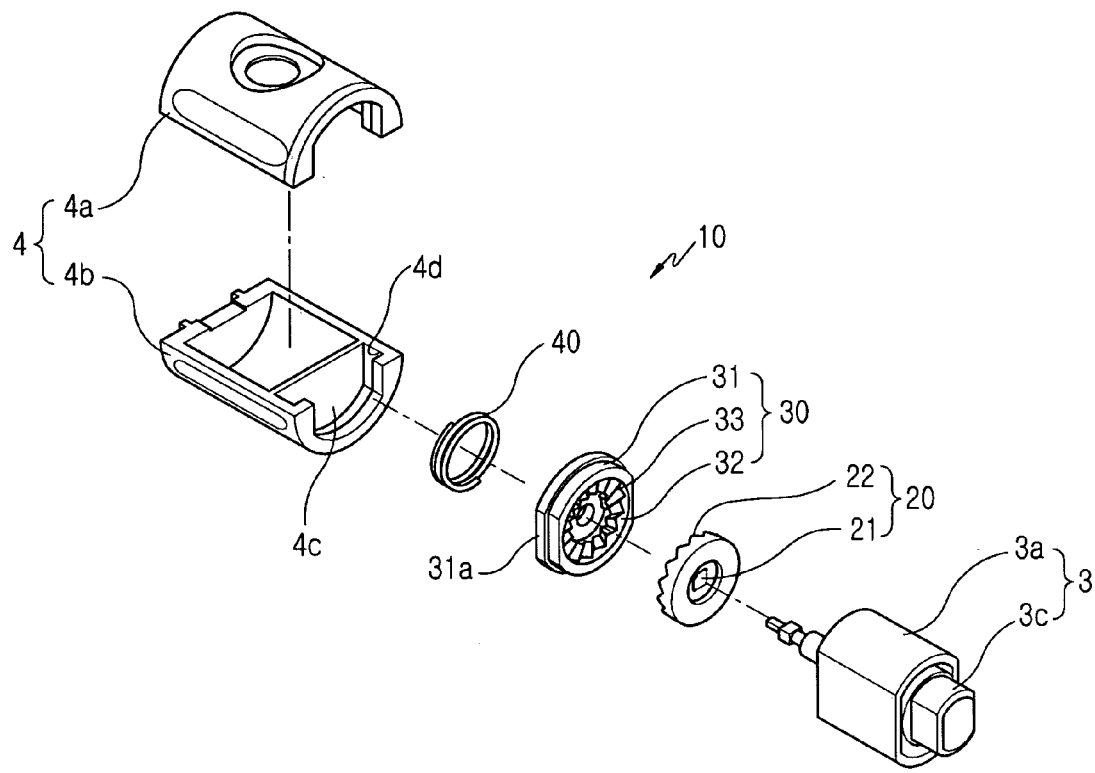
FIG. 4 is an exploded perspective view showing the components of a serration apparatus for a portable terminal according to a first embodiment of the present invention.

In addition, as shown in FIG. 4, the camera lens module 4 comprises upper and lower cases 4a, 4b and a reception space 4c is formed at the one side of the camera lens module 4 so that the first and second serration gearings 20, 30 and the elastic means 40 can be sequentially received within the space 4c.

Figure 5:
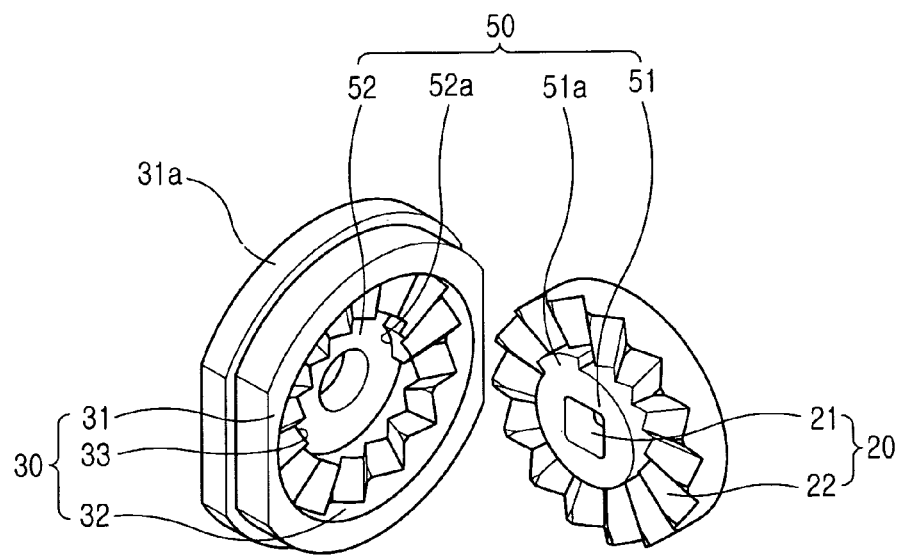
FIG. 5 is an exploded perspective view showing serration gearing among various components of the serration apparatus according to the first embodiment of the present invention.
Figure 6:
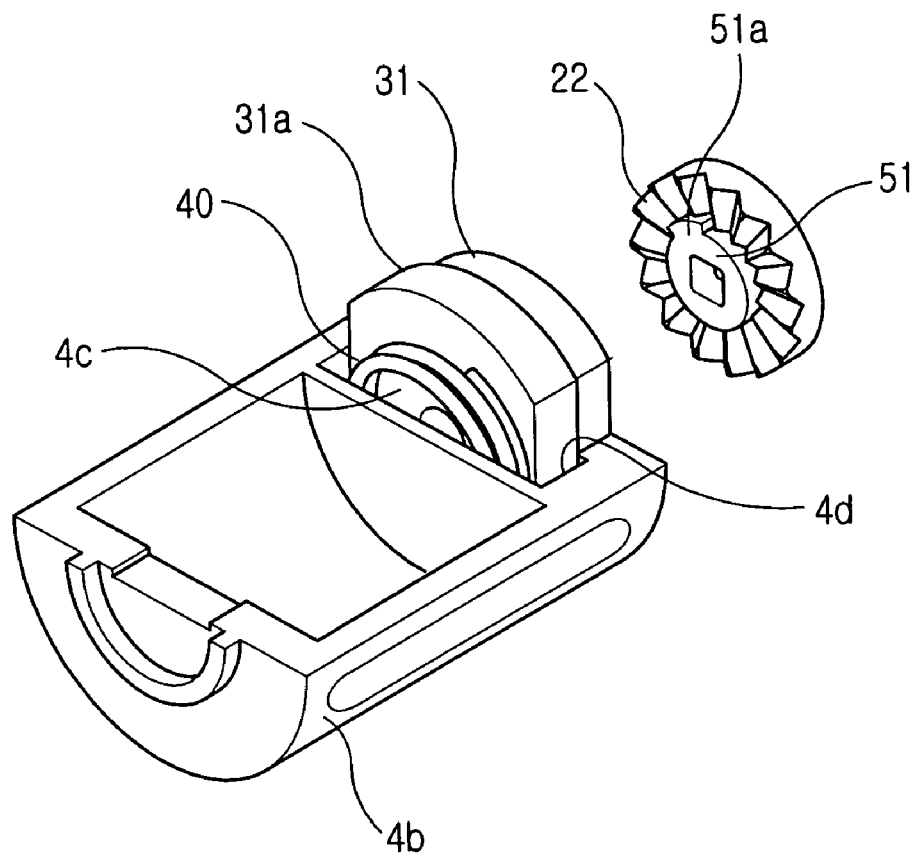
FIG. 6 is a perspective view showing the serration apparatus according to the first embodiment of the present invention while being assembled.
Figure 7:
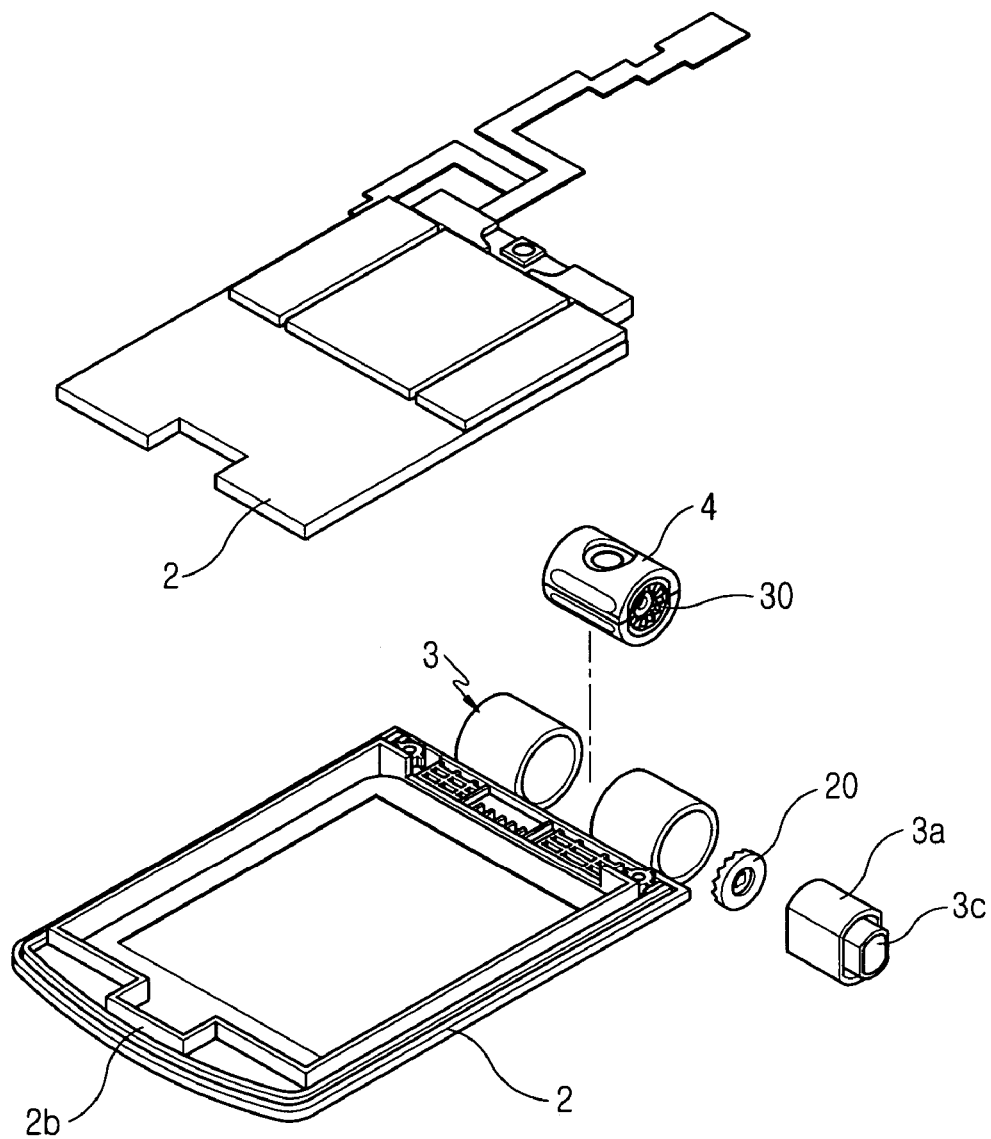
FIG. 7 is an exploded perspective view showing the sequence of assembling the serration apparatus according to the first embodiment of the present invention.

As shown in FIGS. 5 to 7, a gearing-side fixing hole 21 is formed through the center of the first serration gearing 20 so that the one end of the hinge device 3 installed on the terminal is fitted and fixed in the fixing hole 21, and the gearing-side fixing hole 21 has a first toothed section 22 consisting of peaks and valleys having a curvature and formed around the hole 21 in such a way that the first toothed section 22 can mesh and rotate with the second serration gearing 30.

As shown in FIG. 5, the second serration gearing 30 consists of a fixing part 31, a rotation hole 32 and a second toothed section 33, wherein the fixing part 31 is formed around an outer periphery of the second serration gearing 30 in such a way that the fixing part 31 is fitted and fixed in the one side of the camera lens module 4, thus to be capable of rotating along with the camera lens module 4.

As shown in FIG. 5, the rotation hole 32 is formed through the center of the serration gearing 30, so that one end of the hinge device 3 of the terminal is fitted in the rotation hole 32 to rotatably support the second serration gear 30, and the second toothed section 33 is formed around the rotation hole 32 to mesh with the first toothed section 22.

As shown in FIG. 6, the fixing part 31 is formed with a detachment prevention ridge 31a, which is caught in a catch groove 4d formed in the reception space 4c of the camera lens module 4, thereby preventing the fixing part 31 from being detached.

Figure 11:
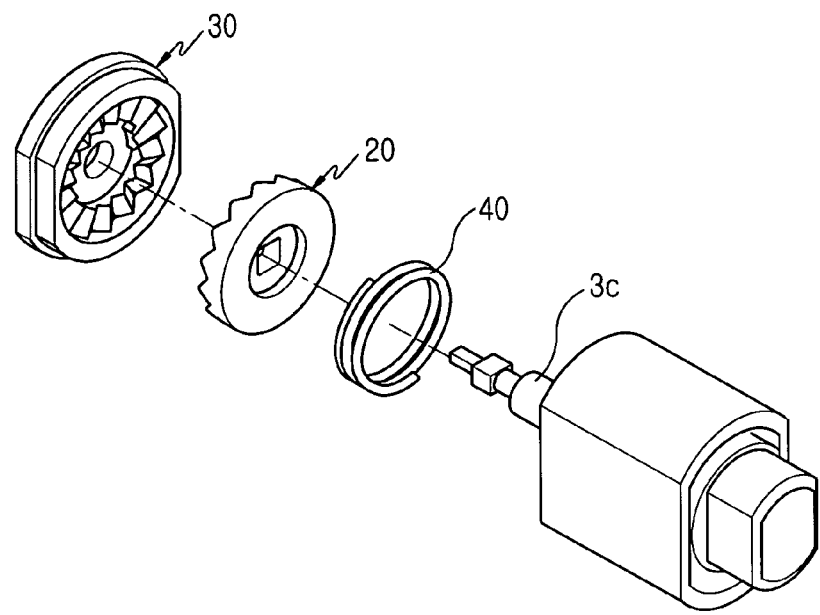
FIG. 11 is an exploded perspective view showing a position for mounting a coil spring among the various components of the serration apparatus according to the first embodiment of the present invention.

As shown in FIG. 4, the elastic means 40 comprises at least one coil spring 40 and as shown in FIG. 11, the coil spring 40 is interposed between one side of the first serration gearing 20 and one side of the hinge device 3 of the terminal, to compress the first and second serration gearings 20, 30 against one another.

Figure 12:
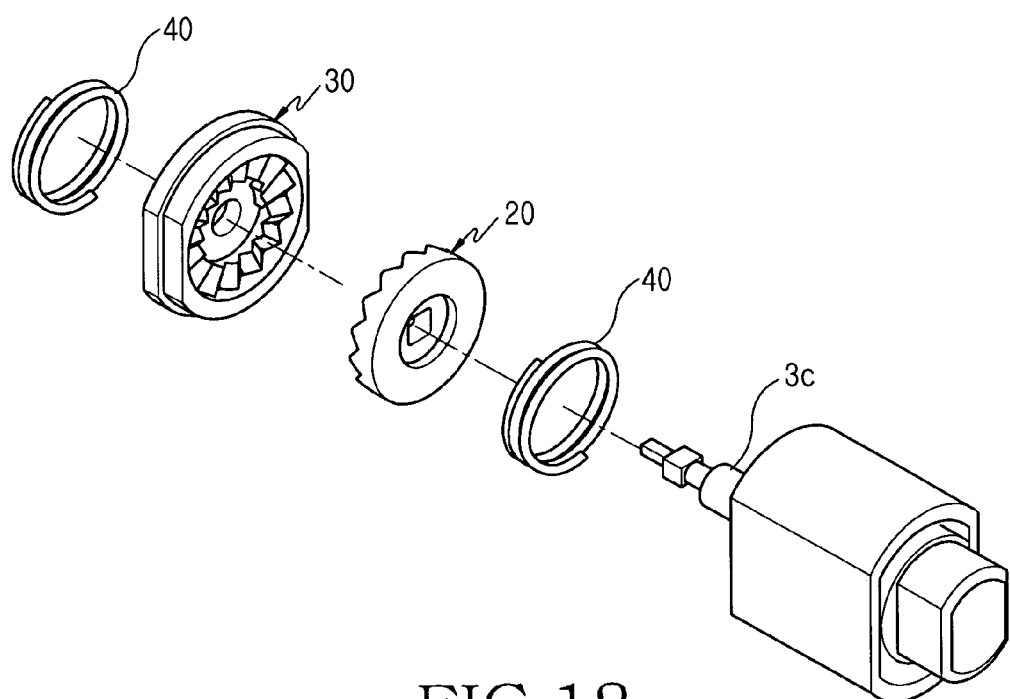
FIG. 12 is an exploded perspective view showing the coil spring among the various components of the serration apparatus according to the first embodiment of the present invention while the coil spring is being mounted.

In addition, as shown in FIG. 12, two coil springs 40 may be provided on both sides of the first and second serration gearing 20, 30 so as to increase the compressing force between the first and second gearings 20, 30.

As shown in FIGS. 5, 6, 9 and 10, the first and second serration gearings 20, 30 are provided with a stopper means 50 to limit the rotation of the camera lens module 4, wherein the stopper means 50 comprises a stopper member 51 and a locker member 52, with the stopper member 51 formed on the center of the first serration gearing 20 and projects outwardly to be fitted in a recess of the locker member 52. The recess of the locker member 52 is engaged with the stopper member 51 and comes into contact with the stopper member 51 when the second serration gearing 30 is rotated, thereby limiting the rotation, and in addition, the locker member 52 is formed with a locking projection 52a caught by a catching projection 51a formed on the stopper member 51, thereby limiting the rotation of the locker member 52.

The first and second serration gearings 20, 30 are preferably formed from a synthetic resin material.

Now, operation of the serration apparatus of a portable terminal according to the first embodiment of the present invention and configured as described above will be described in more detail with reference to FIGS. 4 to 12.

As shown in FIGS. 4 and 5, the first and second serration gearings 20, 30 and the coil spring 40 are sequentially assembled in the reception space 4c formed on the one side of the camera lens module 4.

As shown in FIG. 6, the coil spring 40 is interposed between one side of the camera lens module 4 and one side of the second serration gearing 30, and the first serration gearing 20 is rotatably fitted in a rotation hole 32 formed on the other side of the second serration gearing 30.

At this time, the first toothed section 22 and the second toothed section 33 formed on the first serration gearing 20 and the second serration gearing 30, respectively, mesh with each other.

As shown in FIG. 6, because the second serration gearing 30 is formed with the fixing part 31 having the detachment prevention ridge 31a adapted to be caught in the catch groove 4d formed in the reception space 4c of the camera lens module 4, the detachment prevention ridge of the fixing part 31 is caught in the catch groove 4d simultaneously when the second serration gearing 30 is inserted into the reception space 4c.

Figure 8:
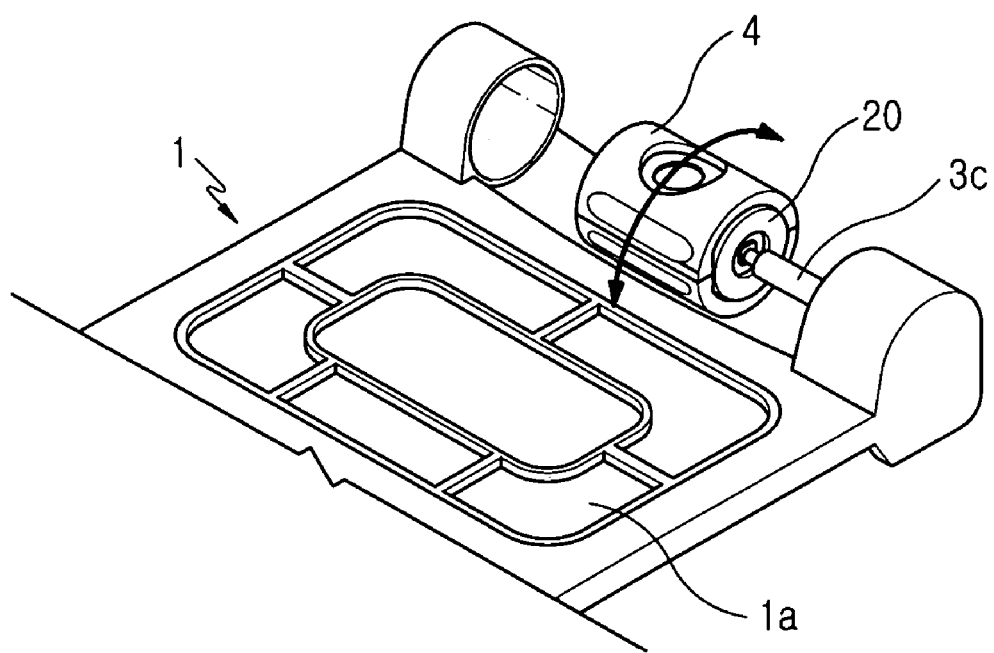
FIG. 8 is an exploded perspective view showing the operating state of the serration apparatus according to the first embodiment of the present invention.

From this state, the camera lens module 4 is rotatably fitted in the terminal and the hinge apparatus 3 of the terminal is assembled to the first and serration gearings 20, 30, as shown in FIGS. 7 and 8.

At this time, one end of the hinge shaft 3c provided on the hinge device 3c is fitted through the gearing-side fixing hole 21 formed at the center of the first serration gearing 20 and fixes the first serration gearing 20, and the one end of the hinge shaft 3c is rotatably fitted through a through-hole formed through the center of the second serration gearing 30, as shown in FIG. 8.

Figure 9:
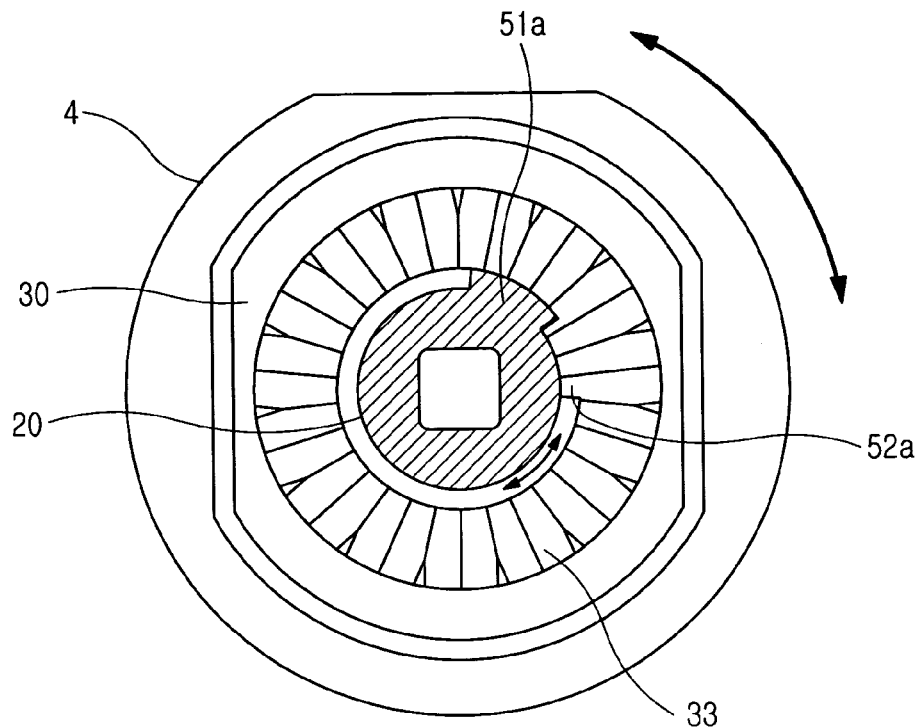
FIG. 9 is a side view showing the serration apparatus according to the first embodiment of the present invention in cross-section, before the serration apparatus is operated.
Figure 10:
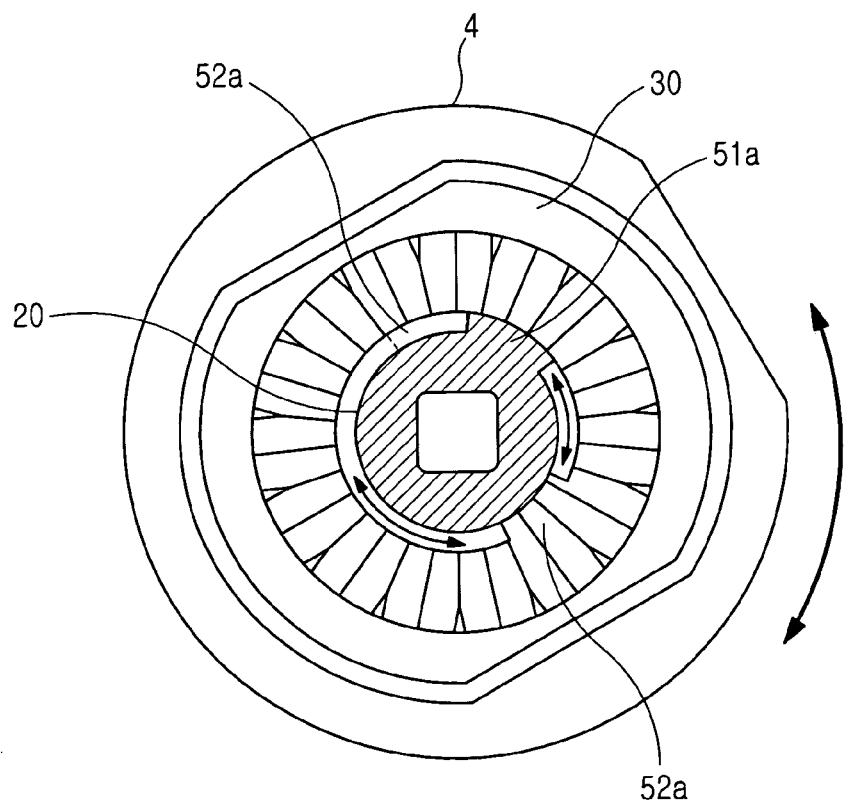
FIG. 10 is a side view showing the serration apparatus according to the first embodiment of the present invention in cross-section, while the serration apparatus is being operated.

From this state, if the camera lens module 4 is rotated in a forward direction as shown in FIGS. 9 and 10, the second serration gearing 30 is rotated along with the camera lens module 4 and the second toothed section 33 is also rotated.

At this time, because the peaks and valleys of the second toothed section 33 are repeatedly disengaged from and engaged with the valleys and peaks of the first toothed section 22 a frictional force is provided and a clicking feeling is created in the camera lens module 4.

As the second serration gearing 30 is compressed by the coil spring interposed between the one side of the lens module 4 and the one side of the second gearing 30 facing the one side of the lens module 4, the second serration gearing 30 is linearly moved in a longitudinal direction of the lens module 4, thereby allowing the engagement and release between the peaks and valleys formed on the first and second toothed sections 22, 33 of the first and second gearings 20, 30.

As shown in FIG. 10, as the recess of the locker member 52 at the center of the second serration gearing 30 is rotated, the locking projection 52a formed on the locker member 52 is rotated along with the locker member 52 and comes into contact with the locking projection 51 a formed on disc-shaped stopper member 51, thereby stopping the rotation of the camera lens module 4, wherein the stopper member is formed at and projects from the center of the first serration gearing 20.

Here, if the camera lens module 4 is rotated in the reverse direction, the first and second toothed sections 22, 33 of the first and second serration gearings 20, 30 are repeatedly disengaged from and engaged with each other, thereby producing frictional force and thus creating the clicking feeling, and the locking projection 52a of the locker member 52 is also rotated and comes into contact with the catching projection 51a formed on the disc-shaped stopper member 51 of the first serration gearing 20, thereby stopping the rotation of the camera lens module 4.

According to another embodiment of the present invention, the coil spring 40 may be interposed between one side of the first serration gearing 20 and one side of the hinge device 3 of the terminal, as shown in FIG. 11.

In addition, as shown in FIG. 12, two or more coil springs 40 may be provided both sides of the second serration gearing to improve the elastic force provided for the gearings 20, 30.

Now, the operation process of the serration apparatus for the portable terminal according to a second embodiment of the present invention, which is configured as described below, will be described in more detail with FIGS. 13 to 17.

Figure 13:
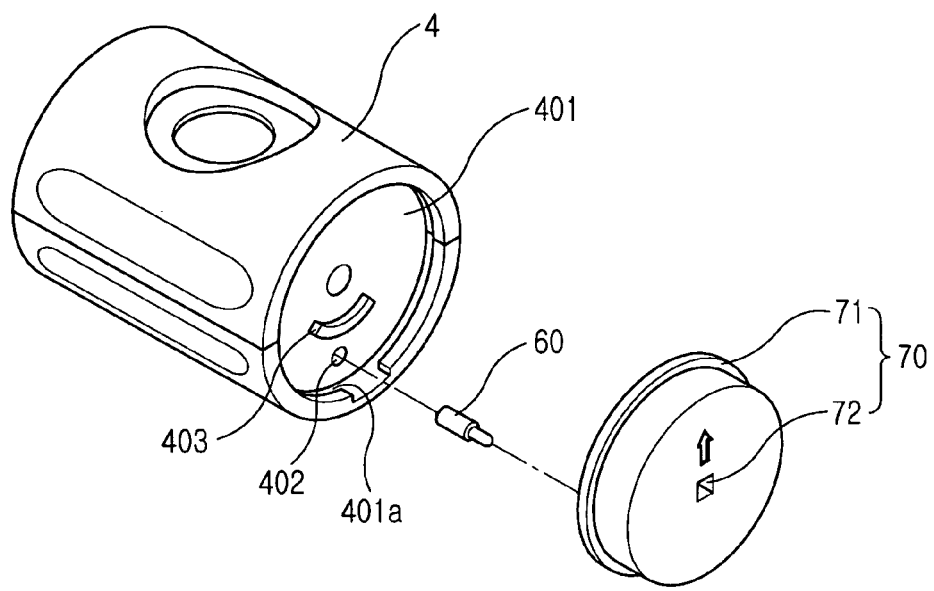
FIG. 13 is an exploded perspective view showing the components of a serration apparatus for a portable terminal according to a second embodiment of the present invention.
Figure 14:
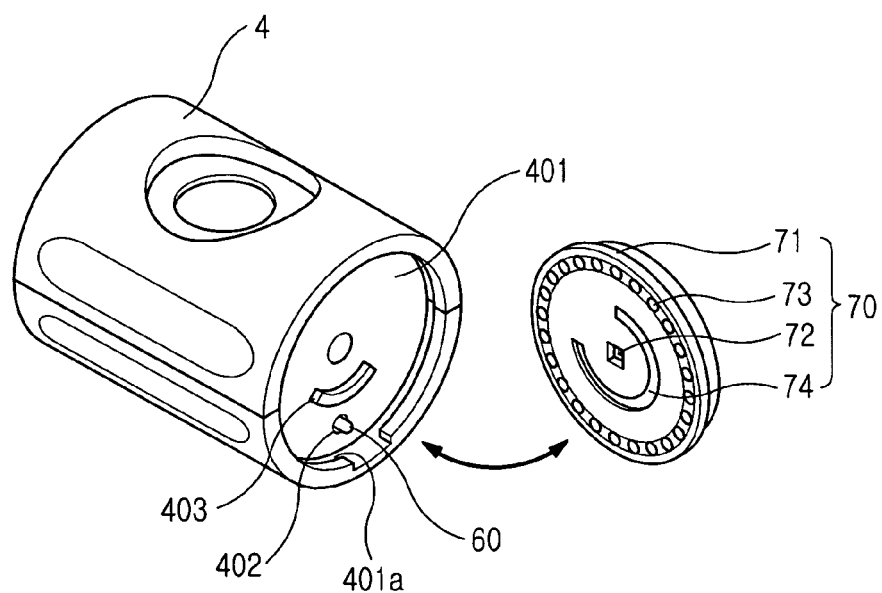
FIG. 14 is a perspective view showing the serration apparatus according to the second embodiment of the present invention in the state of being assembled.

As shown in FIGS. 13 and 14, a pogo spring 60 is mounted on one side of the camera lens module 4. A reception space 401 is formed at one side of the camera lens module 4, wherein a spring insertion groove 402 is formed within the reception space 401 for inserting the pogo spring 60 in the longitudinal direction of the camera lens module 4. Therefore, the pogo spring 60 is inserted into the insertion groove 402.

Figure 15:
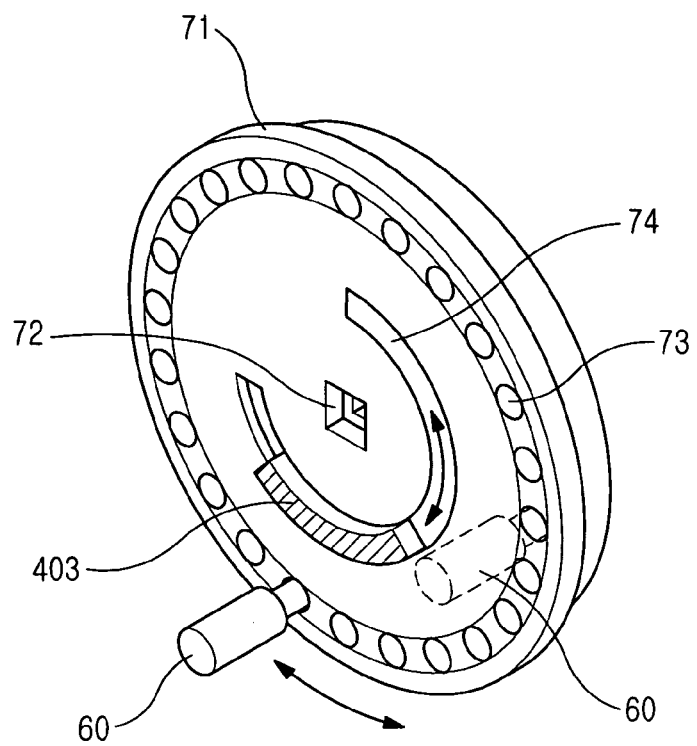
FIG. 15 is a perspective view showing the operating state of the serration apparatus according to the second embodiment of the present invention.
Figure 16:
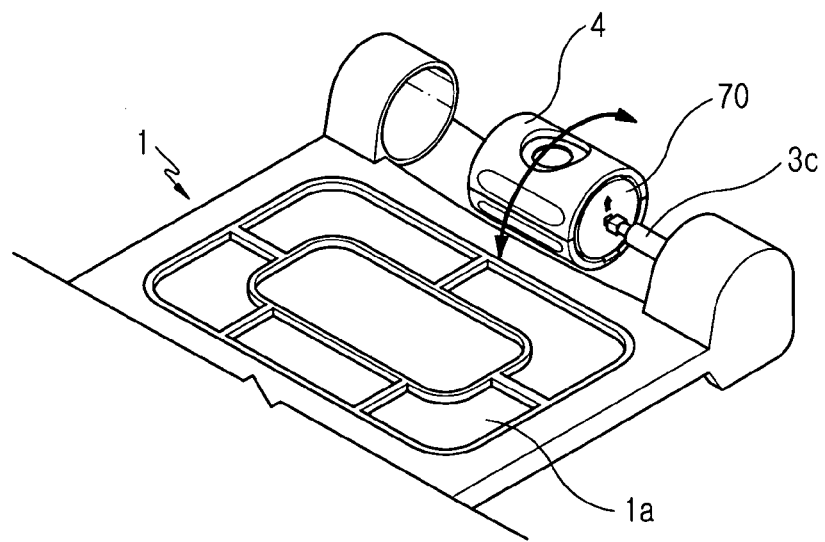
FIG. 16 is a perspective view showing the serration apparatus according to the second embodiment of the present invention in the state of being mounted in a portable terminal.

As shown in FIGS. 14, 15 and 16, a serration module 70 is fitted in the reception space 401 to correspond to the pogo spring 60, wherein the serration module 70 generates frictional force as the camera lens module 4 is rotated in the forward or reverse direction, thereby creating clicking feeling.

The serration module 70 is formed in a disc shape and a plurality of serration grooves 73 are formed and distributed around the inner circumference of the serration module 70 so that the pogo spring 60 is repeatedly engaged with and disengaged from the serration grooves 73, thereby producing frictional force. The serration module 70 is formed with a detachment prevention ridge 71, which is enclosed in a groove 401 a formed in the reception space 401 to prevent the serration module 70 from being detached, as shown in FIG. 14.

Figure 17:
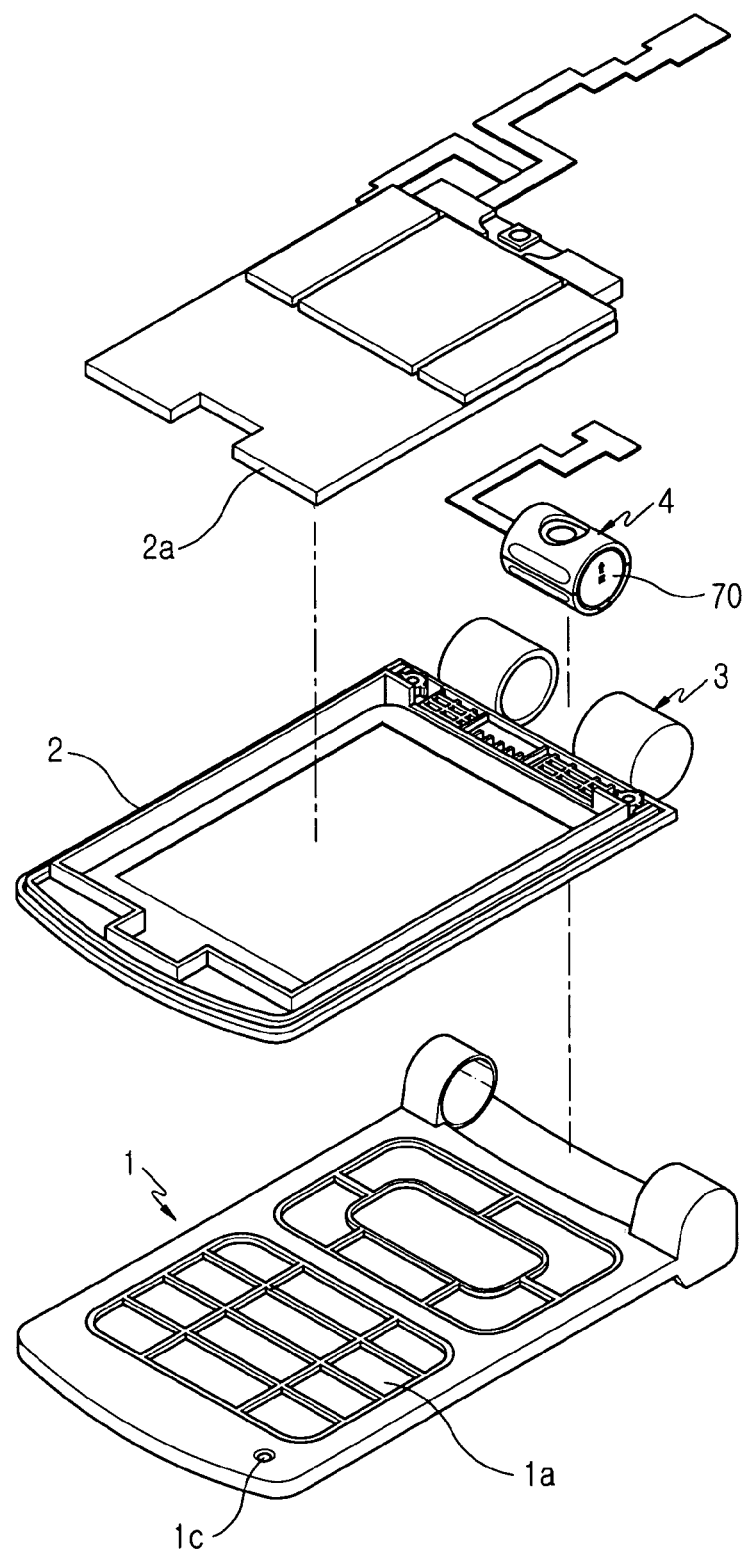
FIG. 17 is an exploded perspective view showing the sequence of assembling the components of the serration apparatus according to the second embodiment of the present invention.

From this state, a camera lens module 4 is rotatably installed in the terminal and the hinge shaft 3c provided on the hinge device 3 of the terminal is also connected, as shown in FIG. 16. One end of the hinge shaft 3c is fitted and fixed in a serration-side fixing hole 72 formed on the serration module 70, as shown in FIGS. 16 and 17.

If the camera lens module 4 is rotated in the forward direction, the pogo spring 60 is also rotated along with the camera lens module 4, as shown in FIG. 15. The serration module 70 is fixed by the hinge shaft 3c and the pogo spring 60 is repeatedly engaged with and disengaged from the pogo grooves 73 of the serration module 70 while being rotated, thereby producing frictional force and thus creating a clicking feeling.

As shown in FIG. 15, stopper means 74 is formed between the fixing hole 72 and the serration grooves 73 to be engaged with a rotation member 403 formed on one side of the camera module 4, thereby limiting the rotation of the camera lens module 4 according to the rotation of the rotation member 403. Preferably, the stopper means 74 is formed as a curved stopper groove.

If the rotation member 403 is fully rotated, the stopper groove 74 comes into contact with one end of rotation member 403, thereby stopping the rotation of the camera lens module 4.

Here, if the camera lens module 4 is rotated in the reverse direction, the rotation member 403 is also rotated and comes into contact with the other end of the stopper groove 74, thereby stopping the rotation of the camera lens module 4.

At this time, the pogo spring 60 is also rotated, and is disengaged from and is engaged with the serration grooves 73 of the serration module 70, thereby generating frictional force and thus creating the clicking feeling.

Now, the operating process of the serration device of a portable terminal according to a third embodiment of the present invention, which is configured as described below, will be described in more detail with reference to FIGS. 18 to 20.

Figure 18:
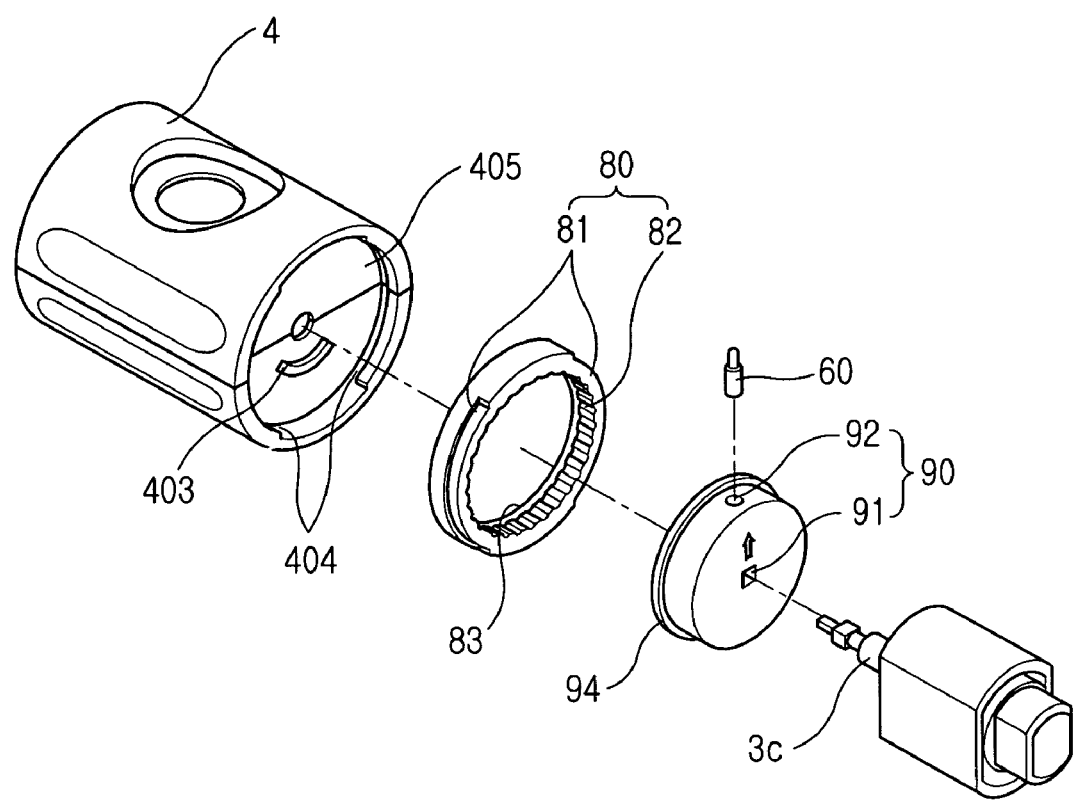
FIG. 18 is an exploded perspective view showing the components of a serration apparatus for a portable terminal according to a third embodiment of the present invention.
Figure 19:
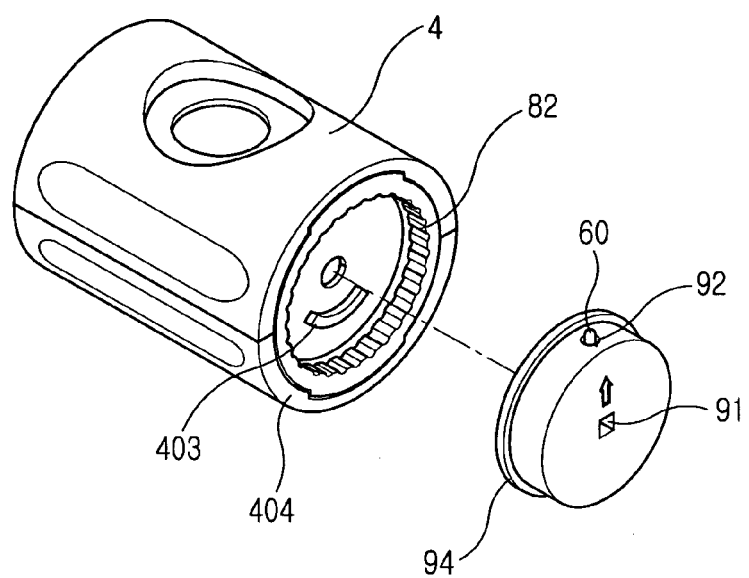
FIG. 19 is a perspective view showing the serration apparatus according to the third embodiment of the present invention in the assembled state.

As shown in FIGS. 18 and 19, a serration housing 80 is mounted on one side of the camera lens module 4. More specifically, a connection space 405 is formed at one side of the camera lens module 4, wherein the serration housing 80 is mounted within the connection space 405 in the longitudinal direction of the lens module 4.

One or more fixing parts 81 are formed around the outer periphery of the serration housing 80, which are adapted to be caught by one or more connection projections 404 formed inside of the connection space 405 for restraining the serration housing 80. The serration housing 80 is restrained simultaneously when the fixing parts 81 are fitted on and caught by the connection projections 404.

A serration module 90 is formed with a detachment prevention ridge 94 to prevent detachment of the serration housing 80 by insertion into a groove 83 formed on the serration housing 80.

As shown in FIGS. 18 and 19, a plurality of serration grooves 82 are formed on the inner circumferential surface of the serration housing 80 so that frictional force is produced as a pogo spring 60 provided on the serration module 90 is repeatedly engaged with and disengaged from the serration grooves 82.

From this state, the camera lens module 4 is rotatably mounted on the portable terminal and the hinge device 3 of the terminal is also connected. One end of the hinge shaft provided on the hinge device 3 is fitted and fixed in a serration-side fixing hole 91 formed at the center of the serration module 90.

If the camera lens module 4 is rotated in the forward direction, the serration housing 80 is also rotated. In that event, the serration module 90 is fixed by the hinge shaft 3c and the pogo spring 60 of the serration module 90 is repeatedly engaged with and disengaged from the serration grooves 82 on the serration housing 80 while the serration housing 80 is being rotated, thereby producing frictional force and thus creating the clicking feeling.

Figure 20:
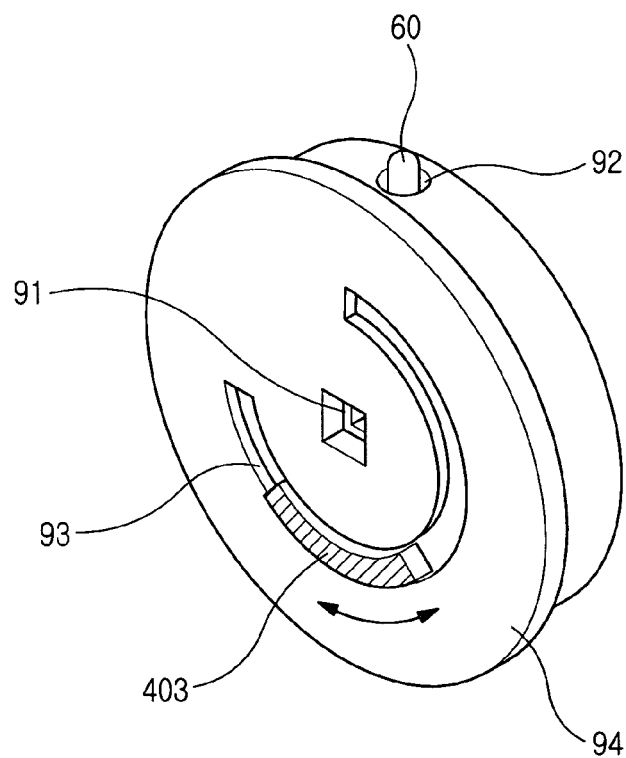
FIG. 20 is a perspective view showing the operating state of the serration apparatus according to the third embodiment of the present invention.

As shown in FIG. 20, one side of the serration module 90 is formed with rotation stopper means 93 to be engaged with a rotation projection 403 formed on one side of the camera lens module 4, thereby limiting the rotation of the camera lens module 4. The rotation stopper means 93 is preferably formed as a curved stopper groove.

If the camera lens module 4 is rotated, the rotation projection 403 is rotated and comes into contact with one end of the stopper groove 93, thereby stopping the rotation of the camera lens module 4.

Here, if the camera lens module 4 is rotated in the reverse direction again, the rotation projection 403 is also rotated and comes into contact with the other end of the stopper groove 93, thereby stopping the rotation of the camera lens module 4.

In that event, the serration grooves 82 on the serration housing 80 are also rotated and the pogo spring 60 of the serration module 90 is repeatedly engaged with and disengaged from the serration grooves 82, thereby producing frictional force and thus creating the clicking feeling.

As described above, by providing a serration module mounted on and assembled to a camera lens module of a portable terminal, it is possible to improve the clicking feeling and assembling process of the camera lens. In addition, by providing plural serration gearings meshing with each other in a portable terminal, it is possible to further improve the rotation clicking feeling of the camera lens.

While the invention has been shown and described with reference to certain preferred embodiments thereof, it will be understood by those skilled in the art that various changes in form and details may be made therein without departing from the spirit and scope of the invention as defined by the appended claims. For example, the present invention can be applied to all types of portable terminals.

What is claimed is:

1. A serration apparatus for a portable terminal having a camera lens module, comprising:
   a first serration gearing;
   a second serration gearing mounted on the camera lens module, wherein the second serration gearing receives the first serration gearing within an interior thereof and is compressed against and meshes with the first serration gearing and when the camera lens module is rotated, the second serration gearing rotates with the camera lens module and produces a frictional force against the first serration gearing, thereby creating a clicking feeling;
- a stopper means for limiting rotation of the camera lens module, the stopper means comprising a disc-shaped stopper member disposed on the first serration gearing and a locker member disposed on the second serration gearing, the locker member being engaged with the disc-shaped stopper member and coming into contact with the disc-shaped stopper member as the second gearing is rotated; and
- elastic means for providing compressing force to cause the first and second gearings to mesh with each other.

2. The serration apparatus as claimed in claim 1, wherein the camera lens module further comprises upper and lower cases and a reception space formed on one side of the camera lens module for receiving the first gearing, the second gearing and the elastic means in sequence.

3. The serration apparatus as claimed in claim 1, further comprising:
- a gearing-side fixing hole formed at a center of the first serration gearing, so that one end of a hinge device provided on the terminal is fitted and fixed in the fixing hole, and
- a first toothed section formed around the gearing-side fixing hole having peaks and valleys with a curvature for rotatably engaging with the second serration gearing.

4. The serration apparatus as claimed in claim 1, wherein the second serration gearing comprises:
- a fixing part fitted and fixed in one side of the camera lens module;
- a rotation hole formed in the second serration gearing, so that the first serration gearing is rotatably fitted in the rotation hole; and
- a second toothed section having peaks and valleys with a curvature for rotatably engaging with a first toothed section of the first serration gearing.

5. The serration apparatus as claimed in claim 4, wherein the fixing part includes a detachment prevention ridge for preventing detachment of the fixing part by fitting the detachment prevention ridge in a locking groove formed in a reception space of the camera lens module.

6. A serration apparatus as claimed in claim 1, wherein the elastic means comprises at least one coil spring.

7. The serration apparatus as claimed in claim 6, wherein the coil spring is provided between the second serration gearing and the camera lens module and/or between the other side of the second serration gearing and one side of a hinge module of the terminal.

8. The serration apparatus as claimed in claim 1, wherein the
- disc-shaped stopper member is formed at and projecting from the center of the first serration gearing; and
- the locker member is defining a recess at the center of the second serration gearing.

9. The serration apparatus as claimed in claim 8, wherein the locker member is additionally formed with a locking projection which is caught by a catch projection formed on the stopper member, thereby limiting rotation.

10. The serration apparatus as claimed in claim 6, wherein the first and second serration gearings and at least one coil spring are sequentially assembled in a reception space reception formed on one side of the camera lens module, wherein a second toothed section of the second gearing is rotated with the camera lens module and peaks and valleys of the second toothed section engage with a first toothed section of the first serration gearing so that the peaks and valleys of the second toothed section are repeatedly engaged with and disengaged from valleys and peaks of the first toothed section, thereby generating a frictional force and thus creating the clicking feeling, and wherein the second serration gearing is compressed against the first serration gearing by the at least one coil spring.

11. A serration apparatus for a portable terminal having a camera lens module, comprising:
- a pogo spring mounted on the camera lens module;
- a serration module connected to the camera lens module to correspond to the pogo spring, thereby producing frictional force and thus creating a clicking feeling as the camera lens module is rotated in a forward or a reverse direction;
- a serration-side fixing hole formed at the center of the serration module and fixedly fitted on one end of a hinge module; and
- a plurality of serration grooves formed around a circumferential surface of the serration-side fixing hole, the pogo spring being repeatedly engaged with and disengaged from the serration grooves, thereby producing the frictional force.

12. The serration apparatus as claimed in claim 11, wherein the camera lens module is formed with a reception space for receiving the serration module at one side thereof, and a spring insertion groove is formed in the reception space, so that the pogo spring is inserted into the groove in a longitudinal direction of the camera lens module.

13. The serration apparatus as claimed in claim 12, wherein the serration module is formed with a detachment prevention ridge adapted to be inserted into a groove formed in the reception space, thereby preventing the detachment of the serration module.

14. The serration apparatus as claimed in claim 13, wherein the serration module is formed in a disc shape.

15. The serration apparatus as claimed in claim 11, wherein the serration module further comprises:
- a stopper means formed between the fixing hole and the serration grooves and engaged with a rotation member formed on one side of the camera lens module to limit rotation of the camera lens module.

16. The serration apparatus as claimed in claim 15, wherein the stopper means comprises a stopper groove, in which one end of the stopper groove comes into contact with the rotation member when the camera lens module is rotated in a forward direction, thereby limiting rotation and an other end comes into contact with the rotation member when the camera lens module is rotated in a reverse direction, thereby limiting rotation.

17. A serration apparatus for a portable terminal having a camera lens module, comprising:
- a serration housing restrained in the camera lens module;
- a serration module provided in the serration housing and having a pogo spring to produce frictional force, thereby creating a clicking feeling when the camera lens module is rotated in a forward or reverse direction, the pogo spring located around a circumferential periphery of the serration module; and
- a stopper means for limiting rotation of the camera lens module, the stopper means comprising a curved stopper groove located on the serration module and a rotation projection formed on one side of the camera lens module, the curved stopper groove being engaged with the rotation projection and contacting the rotation projection as the serration module is rotated.

18. The serration apparatus as claimed in claim 17, wherein a connection space is formed on one side of the camera lens module for connecting and fixing the serration housing.

19. The serration apparatus as claimed in claim 18, wherein at least one fixing part is formed on an outer periphery of the serration housing, which is caught by a connection projection formed within the connection space, thereby restraining the serration housing, and wherein a plurality of serration grooves are formed around the internal circumferential surface of the serration housing, which are engaged with or disengaged from the pogo spring, thereby producing the frictional force.

20. The serration apparatus as claimed in claim 17, wherein the serration module comprises:
   a serration-side fixing hole formed at the center of the serration module and fitted on and fixed to one end of a hinge module; and
   a connection groove formed at a predetermined position on a circumferential periphery of the serration module to engaged with and restrain the pogo spring.

21. The serration apparatus as claimed in claim 17, wherein the serration module is additionally formed with a detachment prevention ridge, which is inserted into and caught by a groove formed in the serration housing, thereby preventing detachment of the serration module.

* * * * *